(12) United States Patent
Akaike et al.

(10) Patent No.: US 6,755,469 B2
(45) Date of Patent: Jun. 29, 2004

(54) SEAT LIFTING DEVICES

(75) Inventors: Fumitoshi Akaike, Nisshin (JP); Kazuhisa Tatematsu, Nagoya (JP); Seiichiro Inadome, Toyota (JP); Seiya Nishimura, Okazaki (JP)

(73) Assignee: Araco Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 10/461,046

(22) Filed: Jun. 11, 2003

(65) Prior Publication Data

US 2003/0227204 A1 Dec. 11, 2003

(51) Int. Cl.[7] .............................................. B60N 2/427
(52) U.S. Cl. ........................ 297/344.15; 297/216.15; 297/216.16; 297/216.18; 297/216.19; 297/216.2
(58) Field of Search ....................... 297/344.15, 216.15, 297/216.16, 216.17, 216.18, 216.19, 216.2

(56) References Cited

U.S. PATENT DOCUMENTS

| | | | | |
|---|---|---|---|---|
| 4,520,986 A | * | 6/1985 | Liljequist et al. | 297/344.15 X |
| 5,651,585 A | * | 7/1997 | Van Duser | 297/344.15 X |
| 5,782,533 A | | 7/1998 | Fischer et al. | 297/344.15 X |
| 5,882,061 A | | 3/1999 | Guillouet | 297/344.15 X |
| 6,076,887 A | * | 6/2000 | Andersson | 297/216.15 X |
| 6,193,297 B1 | * | 2/2001 | Vandermolen | 297/216.15 X |
| 6,250,705 B1 | | 6/2001 | Zuch | 297/216.16 X |
| 6,312,050 B1 | * | 11/2001 | Eklind | 297/216.15 |
| 6,334,643 B1 | * | 1/2002 | Lindblad et al. | 297/216.16 X |
| 6,347,778 B1 | | 2/2002 | Koga et al. | 248/421 |
| 6,406,092 B1 | * | 6/2002 | Cordes et al. | 297/216.15 X |
| 6,416,127 B1 | * | 7/2002 | Galbreath, Jr. et al. | 297/216.15 X |
| 6,616,117 B2 | * | 9/2003 | Gryp et al. | 297/344.15 X |
| 2003/0160483 A1 | * | 8/2003 | Becker et al. | 297/216.16 |

FOREIGN PATENT DOCUMENTS

GB 2041062 A * 9/1980 ............ 297/344.15

* cited by examiner

*Primary Examiner*—Rodney B. White
(74) *Attorney, Agent, or Firm*—Patterson, Thuente, Skaar & Christensen, P.S.

(57) ABSTRACT

Seat lifting devices disposed between a seat support for supporting a seat cushion and a seat mount for mounting the seat support are taught that comprise a linking mechanism movably interconnecting the seat support and the seat mount, so that the seat cushion is vertically adjusted when the linking mechanism is operated, and a seat support pulling means connected to the seat support and the seat mount. The seat support pulling means is adapted to be shortened when the seat support is subjected to an impact.

10 Claims, 6 Drawing Sheets

SEAT LIFTING DEVICES

This application claims priority to Japanese Patent Application Serial Number 2002-170405, the contents of which are incorporated herein by reference.

BACKGROUND OF THE INVENTION

1. Field of the Invention

The present invention relates to seat vertical devices or seat lifting devices for adjusting height of a seat cushion of a vehicle seat.

2. Description of the Related Art

A seat vertical device or seat lifting device for adjusting height of a seat cushion of a vehicle seat is taught, for example, by U.S. Pat. No. 6,347,778 and Japanese Laid-Open Patent Publication No. 2001-163091.

Typically, a vehicle seat comprises a seat back and a seat cushion. The seat back and the seat cushion are respectively supported by a seat back frame and a cushion frame. The cushion frame includes a pair of opposing elongated plate-shaped members or frame elements. The cushion frame thus constructed is seated on a seat slide device that are disposed on a vehicle floor. The seat slide device has a pair of slide rail assemblies that are arranged in parallel each other. The slide rail assemblies are positioned such that the distance therebetween is substantially identical to the distance between the frame elements of the cushion frame. Each of the slide rail assemblies includes an upper rail and a lower rail. The lower rail is affixed to the vehicle floor. The upper rail slidably engages the affixed lower rail.

In the known art described in U.S. Pat. No. 6,347,778, each of the frame elements of the cushion frame is linked to the upper rail of the slide rail assembly via front and rear linking mechanisms, which mechanisms constitute a seat lifting device. The front and rear linking mechanisms respectively include a front bracket and a rear bracket that are upwardly projected from the upper rail. The front linking mechanism further includes a front arm, which arm is pivotally attached to the frame element and the front bracket via pivot pins. Similarly, the rear linking mechanism further includes a rear arm, which arm is pivotally attached to the frame element and the rear bracket via pivot pins.

Further, the seat lifting device includes a drive mechanism, which drive mechanism also constitutes the seat lifting device. The drive mechanism includes a lever, an intermediate bracket upwardly project from the upper rail and a linking rod. The lever is pivotally attached to the intermediate bracket in its middle portion. One end of the linking rod is pivotally connected to the rear arm. Also, the other end of the linking rod is pivotally connected to an upper end of the lever. Further, a nut is rotatably attached to a lower end of the lever. This nut threadably engages a threaded shaft that is driven or rotated by a drive means or motor. Therefore, when the threaded shaft is rotated by the motor, the nut moves along the threaded shaft, thereby pivoting the lever around the intermediate bracket. As a result, the linking rod connected to the lever moves back and forth, thereby pivoting the rear arm. Thus, the flame element can be lifted, so that the height of the vehicle seat cushion can be adjusted.

In the known seat lifting device, the rear arm is formed with a laterally elongated slot (first slot) and a vertically elongated arcuate slot (second slot) having a plurality of concave portions arranged therealong. On the other hand, the rear arm is provided with a pivot pin that is received in the first slot and a locking pin that is received in the second slot.

According to the known seat lifting device, when an excessive forward and upward force is applied to the cushion frame via a seatbelt that is attached thereto, each of the frame elements of the cushion frame may be pulled forwardly and upwardly and moves in this direction. As a result, the rear arm rotates around the pivot pin. However, because the pivot pin is received within the elongated slot, the rear arm is shifted forwardly, thereby engaging the locking pin with one of the concave portions of the second slot. Thus, the seat lifting device is locked, thereby preventing the frame element from further moving forwardly and upwardly. As a result, the rear arm can be effectively prevented from further rotating around the pivot pin. Therefore, the drive mechanism that is linked to the rear arm can be effectively prevented from being subjected to an undesirable large force.

As will be recognized, if the seat lifting device is not locked when the excessive forward and upward force is applied to the cushion frame, the frame element cannot be prevented from moving forwardly and upwardly. Therefore, the rear arm can freely rotate around the pivot pin. As a result, a considerable force may be applied to the drive mechanism linked to the rear arm. Such a force may exert undesirable effects on the drive mechanism.

SUMMARY OF THE INVENTION

It is, accordingly, one object of the present teachings to provide improved seat lifting devices for adjusting height of a seat cushion of a vehicle seat.

For example, in one aspect of the present teachings, seat lifting devices disposed between a seat support for supporting a seat cushion and a seat mount for mounting the seat support are taught that comprise a linking mechanism movably interconnecting the seat support and the seat mount, so that the seat cushion is vertically adjusted when the linking mechanism is operated, and a seat support pulling means connected to the seat support and the seat mount. The seat support pulling means is adapted to be shortened when the seat support is subjected to an impact.

In such seat lifting devices, when the seat support is subjected to an impact and a large force is applied to the seat support, the seat support pulling means that is connected to the seat support and the seat mount is effectively shortened, so that the seat support is forced toward the seat mount. As a result, the seat lifting device is reliably locked, thereby preventing the seat support from moving forwardly and upwardly.

Other objects, features and advantage of the present invention will be ready understood after reading the following detailed description together with the accompanying drawings and the claims.

DETAILED DESCRIPTION OF THE INVENTION

In one embodiment of the present teachings, seat lifting devices disposed between a cushion frame for supporting a seat cushion and a seat slide device for mounting the cushion frame may comprise a linking mechanism movably interconnecting the cushion frame and the seat slide device, so that the seat cushion is vertically adjusted when the linking mechanism is operated, and a lead wire connected to the cushion frame and the seat slide device. The lead wire is adapted to be shortened when the cushion frame is subjected to an impact. Optionally, the seat lifting devices may comprise an actuator for actuating the lead wire. The actuator may preferably be adapted to shorten the lead wire when the seat support is subjected to the impact, thereby forcing the cushion frame toward the seat slide device.

Optionally, the actuator may comprises a drive means of a seatbelt pretensioning device. The drive means of the seatbelt pretensioning device may preferably comprise a cylinder and a piston that is connected to a seatbelt. The piston may be connected to the lead wire, thereby simultaneously pulling the seatbelt and the lead wire when the cushion frame is subjected to the impact.

Optionally, the seat lifting devices may further comprise a free arm that is movably connected to the seat slide device so as to pivot back and forth. The lead wire may preferably be connected to the seat slide device via the free arm. Further, the lead wire may preferably comprise a flexible wire.

Two detailed representative embodiments of the present teachings will now be described in further detail with reference to FIGS. 1 to 6.

First Detailed Representative Embodiment

The first detailed representative embodiment will now be described with reference to FIGS. 1 to 5.

Figure 1:
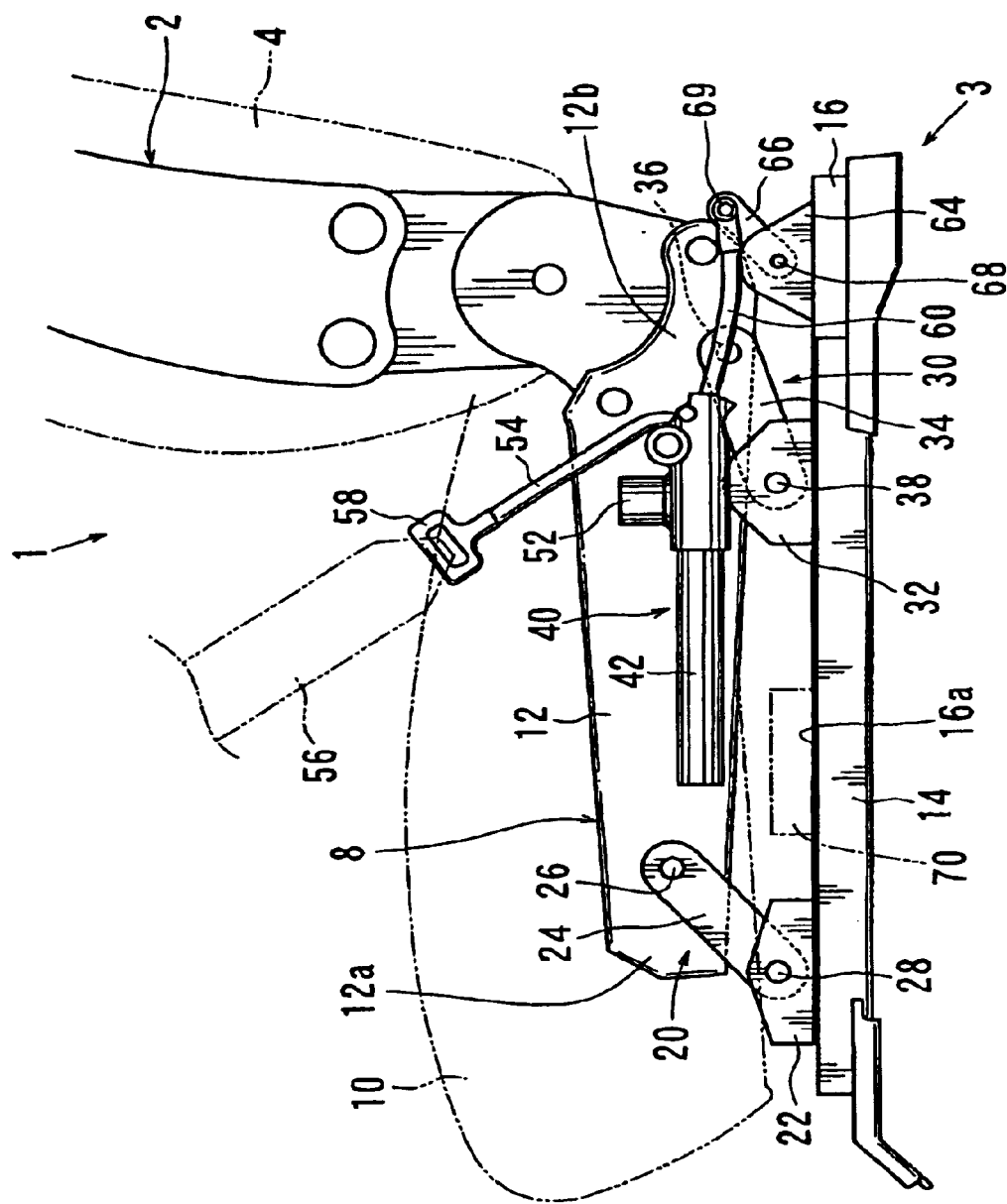
FIG. 1 is a side view illustrating a vehicle seat having a seatbelt pretensioning device and a seat lifting device according to a first embodiment of the present teachings, in which the vehicle seat is adjusted to a lowered position.
Figure 2:
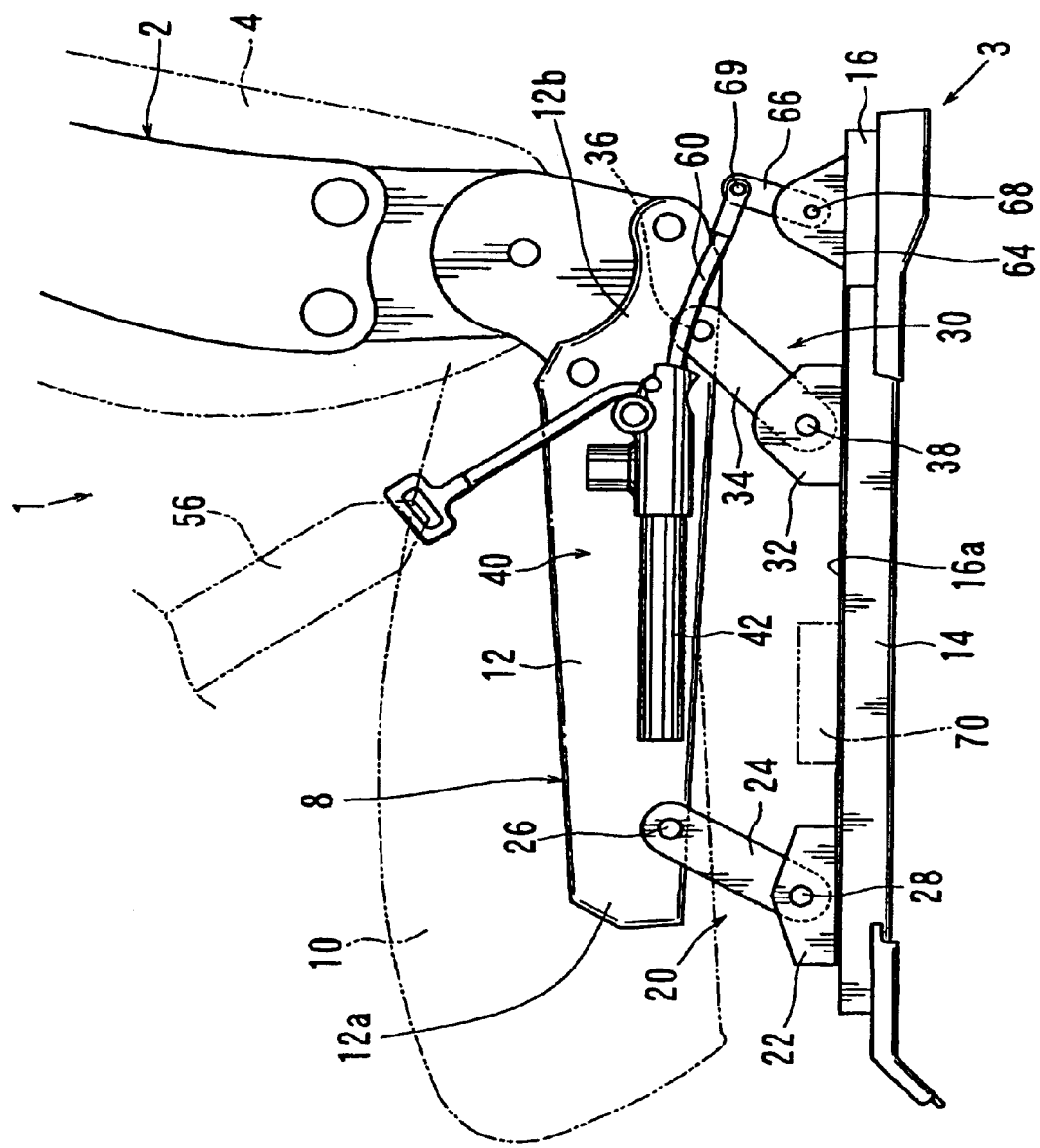
FIG. 2 is a side view illustrating the vehicle seat, in which the vehicle seat is adjusted to a lifted position.

As shown in FIGS. 1 and 2, a vehicle seat 1 of this embodiment generally comprises a seat back 4 and a seat cushion 10 (i.e., seat body). The seat back 4 and the seat cushion 10 are respectively supported by a seat back frame 2 and a cushion frame (i.e., seat support) 8. Typically, the cushion frame 8 includes a pair of opposing elongated plate-shaped members or frame elements 12 (one of which is shown) and a connector member (not shown). Each of the frame elements 12 has a front portion 12a and a rear portion 12b. The rear portions 12b of the frame elements 12 are interconnected by the connector member, thereby defining the cushion frame 8 as a unit. In addition, a seatbelt 56 may preferably connected to the frame elements 12 via a seatbelt pretensioning device 40 (which will be hereinafter described).

The cushion frame 8 thus constructed is seated on a pair of slide rail assemblies 3 (one of which is shown) of a seat slide device (i.e., seat mount) that are disposed in parallel on a vehicle floor (not shown). The slide rail assemblies 3 may be positioned such that the distance therebetween is substantially identical to the distance between the frame elements 12 of the cushion frame 8. Each of the slide rail assemblies 3 may include an upper rail 16 and a lower rail 14. The lower rail 14 may be affixed to the vehicle floor. The upper rail 16 slidably engages the affixed lower rail 14. In addition, the frame elements 12 of the cushion frame 8 are linked to the upper rails 16 via a pair of front linking mechanisms 20 (one of which is shown) and a pair of rear linking mechanisms 30 (one of which is shown), which mechanisms constitute a seat lifting device. Thus, the cushion frame 8 may preferably be operatively connected to the slide rail assemblies 3.

The cushion frame 8 can be moved back and forth by sliding the upper rail 16 back and forth along the lower rail 14. Therefore, the longitudinal position of the seat cushion 10 can be adjusted by sliding the upper rail 16 along the lower rail 14. In addition, the cushion frame 8 can be moved up and down by operating the seat lifting device. Therefore, the vertical position of the seat cushion 8 can be adjusted by operating the seat lifting device.

As shown in FIGS. 1 and 2, each of the front linking mechanisms 20 of the seat lifting device may include a plate-shaped linking arm 24 and a pivot bracket 22 that that is fixed to an upper surface 16a of the upper rail 16. An upper end of the arm 24 is pivotally connected to the front portion 12a of the frame element 12 via a pivot pin 26 such that the arm 24 can pivot back and forth around the pivot pin 26. Further, a lower end of the arm 24 is pivotally connected to the pivot bracket 22 via a pivot pin 28 such that the arm 24 can pivot back and forth around the pivot pin 28.

Similarly, each of the rear linking mechanisms 30 of the seat lifting device may include a plate-shaped linking arm 34 and a pivot bracket 32 that that is fixed to an upper surface 16a of the upper rail 16. An upper end of the arm 34 is pivotally connected to the rear portion 12b of the frame element 12 via a pivot pin 36 such that the arm 34 can pivot back and forth around the pivot pin 36. Further, a lower end of the arm 34 is pivotally connected to the pivot bracket 32 via a pivot pin 38 such that the arm 34 can pivot back and forth around the pivot pin 38.

Figure 3:
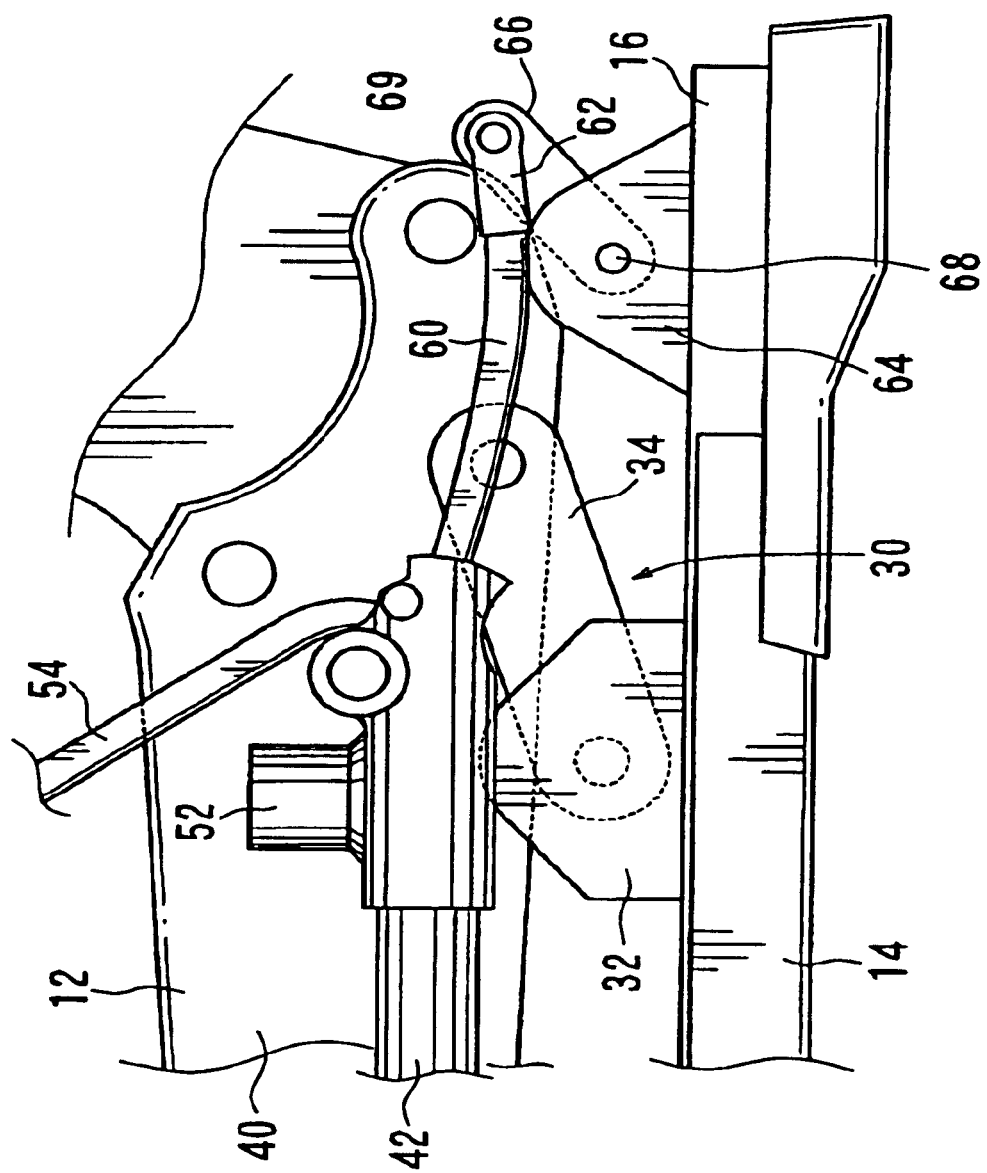
FIG. 3 is an enlarged partially side view of FIG. 1.
Figure 4:
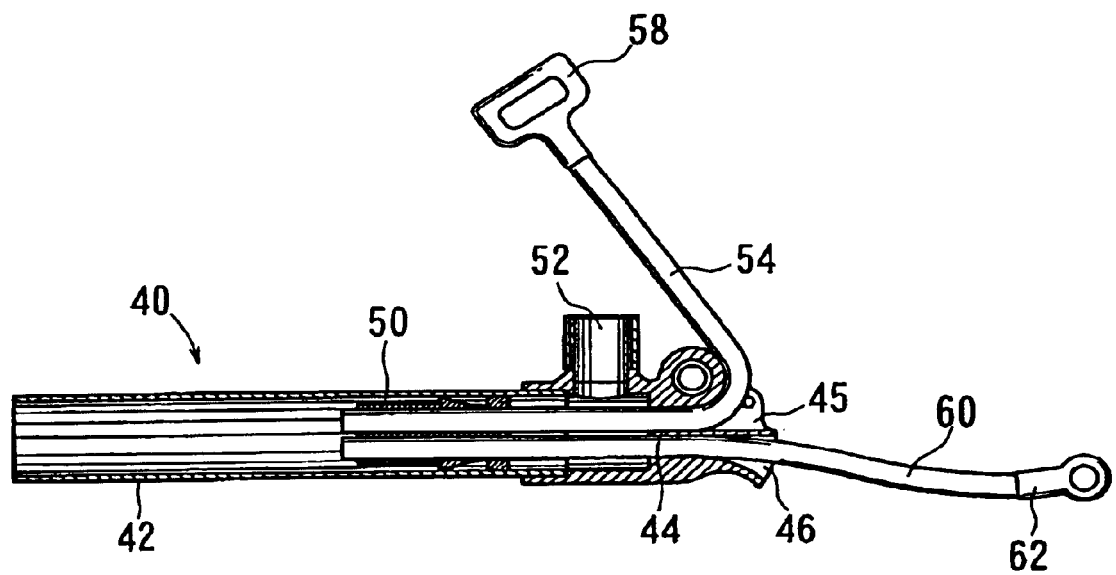
FIG. 4(a) is a cross-sectional view of a seatbelt pretensioning device, in which a gas generator is not actuated.
FIG. 4(b) is a cross-sectional view of a seatbelt pretensioning device, in which the gas generator is actuated.
Figure 4:
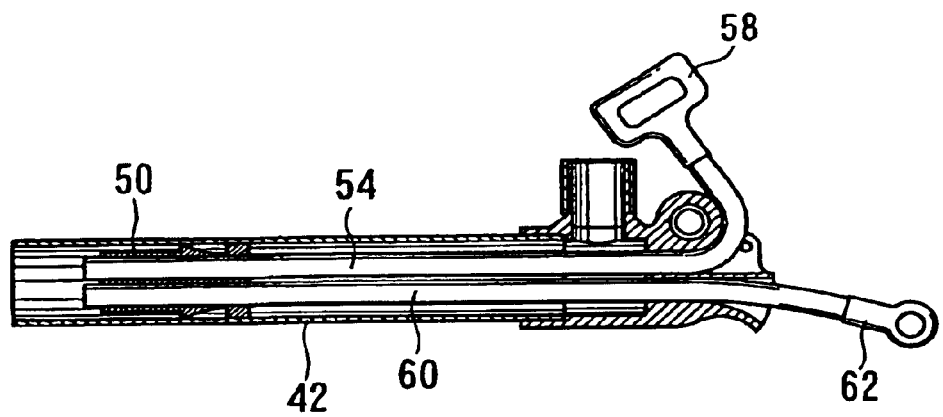

As shown in FIGS. 1 to 3, the seat lifting device may include a movable member or plate-shaped free arm 66 and a pivot bracket 64 that that is fixed to an upper surface 16a of the upper rail 16 at its rearmost portion. An upper end of the arm 66 is linked to the seatbelt pretensioning device 40, which will be hereinafter described. Further, a lower end of the arm 66 is pivotally connected to the pivot bracket 64 via a pivot pin 68 such that the arm 66 can pivot back and forth around the pivot pin 68.

The seat lifting device may further include a pair of drive mechanisms 70. Typically, each of the drive mechanisms 70 may preferably includes a drive source assembly that comprises a gear box (not shown) and a motor (not shown) coupled thereto. The drive source assembly of the drive mechanism 70 may preferably be mounted on the upper surface 16a of the upper rail 16. The gear box has a threaded shaft (not shown) extending therethrough. The threaded shaft threadably engages a drive gear (not shown) received in the gear box, so as to move back and forth when the motor is forwardly or reversely driven. Further, a rear end of the threaded shaft may preferably be connected to the upper end of the arm 34, so that the threaded shaft can pivot the arm 34 back and forth when the threaded shaft moves back and forth.

According to the seat lifting device of this embodiment, when each of the drive mechanisms 70 is actuated, the front and rear linking mechanisms 20 and 30 of the seat lifting device are operated, thereby changing height of the seat cushion 10. That is, when the motor of the drive mechanism 70 is driven forwardly or reversely, the threaded shaft moves forwardly or backwardly, thereby pivoting the linking arm 34 of the rear linking mechanism 30 forwardly or backwardly, because the threaded shaft is connected to the upper end of the arm 34. As a result, the rear linking mechanism 30 rises or falls down, thereby shifting the frame element 12 upwardly or downwardly. Further, at this time, the linking arm 24 of the front linking mechanism 20 is also pivoted forwardly or backwardly, because the linking arm 24 is linked to the frame element 12. Thus, the seat cushion 10 can be continuously vertically adjusted, so as to have various vertical positions (e.g., a maximum lowered position (FIG. 1) and a maximum lifted position (FIG. 2)).

As shown in FIGS. 1 to 3, the vehicle seat 1 of this embodiment preferably includes a seatbelt pretensioning device 40 that is mounted on the frame element 12. Typically, the seatbelt 56 is wound, around a winding shaft (not shown) and is received within an automatic locking retractor (not shown). The automatic locking retractor can lock the winding shaft to prevent rewinding of the seatbelt when a vehicle is subjected to an impact. Thus, the occupant is restrained when the vehicle is subjected to the impact. However, if slack exists in the seatbelt when the winding shaft is locked, the occupant can not be sufficiently restrained. If the seatbelt is pretensioned and has no slack when the winding shaft is locked, it is expected that the occupant will be reliably restrained. The seatbelt pretensioning device 40 exerts a traction force on the seatbelt before the winding shaft of the seatbelt is locked.

The seatbelt pretensioning device 40 may preferably be positioned adjacent to the rear end 12b of the frame element 12. As best shown in FIGS. 4(a) and 4(b), the seatbelt pretensioning device 40 may preferably include a closed cylinder 42, a drive force generating means (or gas generator) 52 that is coupled to the cylinder 42, and a movable means (or piston) 50 that is received within a cylinder 42, which constitute a drive means of the seatbelt pretensioning device 40. Further, the drive means of the seatbelt pretensioning device 40 constitutes an actuator of a seat support pulling means (which will be hereinafter described). As will be appreciated, the gas generator 52 is positioned behind the piston 50. The gas generator 52 is electrically connected to an impact sensor (not shown) via an electric wire (not shown) such that a sensor signal will be transmitted to the gas generator 52 when the vehicle is subjected to the impact. As will be appreciated, the gas generator 52 may be actuated by the signal, thereby rapidly generating high pressure gas within the cylinder 42. As a result, the piston 50 may be pushed forwardly by a suitable stroke length within the cylinder 42.

As shown in FIGS. 4(a) and 4(b), a first flexible lead wire 54 is connected to the piston 50. The first lead wire 54 connected to the piston 50 is led out through a first guide bore 45 that is formed in a rear end of the cylinder 42. The first lead wire 54 is connected to a seatbelt anchor 58 (or a seatbelt buckle). As shown in FIGS. 1 and 2, the seatbelt anchor 58 is connected to the seatbelt 56. Further, a second flexible lead wire (i.e., seat support pulling means or connecting member) 60 having a substantial length is connected to the piston 50. The second lead wire 60 connected to the piston 50 is led out through a second guide bore 46 that is formed in the rear end of the cylinder 42. Further, the second guide bore 46 is separated from the first guide bore 45 by a wall 44. The second lead wire 60 is connected to an arm connector 62. As shown in FIGS. 1 to 3, the arm connector 62 is connected to the free arm (i.e., seat support pulling means or connecting member) 66 via a connector pin 69.

According to the seat lifting device of this embodiment, as previously described, when each of the drive mechanisms 70 is actuated, the rear linking mechanism 30 rises or falls down. As a result, the frame element 12 linked to the rear linking mechanism 30 is shifted upwardly or downwardly. Thus, the seat cushion 10 can be continuously vertically adjusted to various vertical positions (e.g., the maximum lowered position and the maximum lifted position). As will be appreciated, when the frame element 12 is vertically moved, the seatbelt pretensioning device 40 is also vertically moved, thereby pushing or pulling the second lead wire 60. However, the second lead wire 60 can freely move back and forth, because it is connected to the free arm 66 that is pivotally connected to the pivot bracket 64. Therefore, the second lead wire 60 does not interfere with the upward and downward motion of the frame element 12.

Further, according to the seat lifting device of this embodiment, when the vehicle is subjected to the impact and a large or excessive force is applied to the cushion frame 8 via the seatbelt 56 in a direction to separate the cushion frame 8 from the seat slide device, each of the frame elements 12 of the cushion frame 8 is pulled forwardly and upwardly. As a result, the front and rear linking mechanisms 20 and 30 that are linked to the frame element 12 are pulled in this direction. However, at this time, as described above, the impact sensor senses the impact and sensor signal is transmitted to the gas generators 52 via the electric wire. The transmitted sensor signal preferably actuates the gas generator 52, thereby rapidly generating the high pressure gas within the cylinder 42. The generated gas may force the pistons 50 by a suitable stroke length within the cylinder 42, thereby immediately shifting the piston 50 from a normal position shown in FIG. 4(a) to a retracted position shown in FIG. 4(b).

Figure 5:
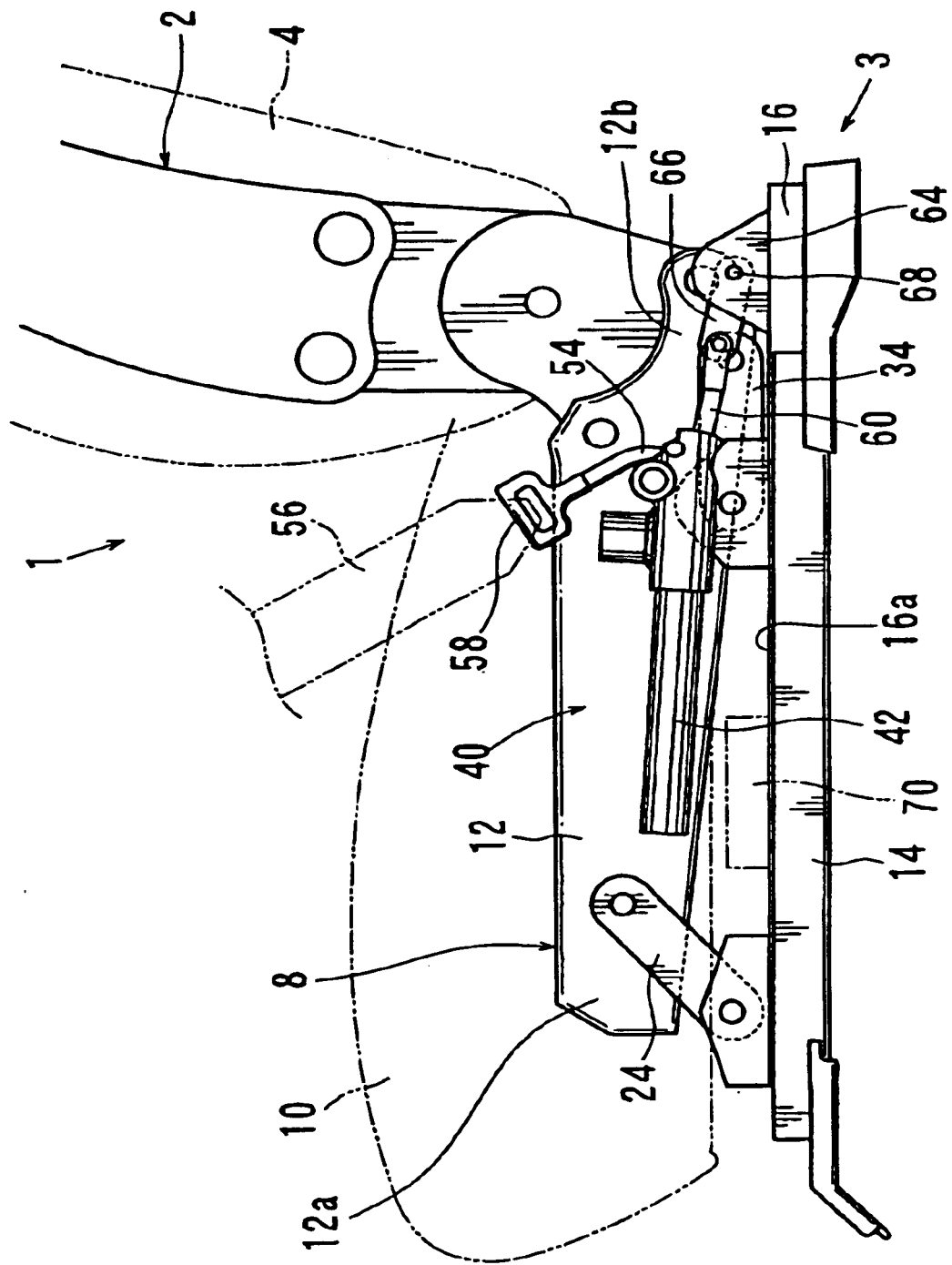
FIG. 5 is a side view similar to FIG. 1, which view illustrates a condition that the gas generator of the seatbelt pretensioning device is actuated.

Thus, the first lead wire 54 connected to the pistons 50 is drawn or pulled into the cylinder 42 by a desired distance, thereby pulling back the seatbelt 56 connected to the seatbelt anchor 58 by a desired distance. As a result, a traction force is exerted on the first lead wire 54 and the seatbelt 56. Therefore, the seatbelt 56 is tensioned or tightened, so that the restraining force applied to the occupant of the seat is effectively increased. On the other hand, the second lead wire 60 connected to the pistons 50 is simultaneously drawn or pulled into the cylinder 42 by a desired distance (i.e., shortened), thereby forwardly rotating the free arm 66 connected to the arm connector 62 and pulling the free arm 66 and the arm connector 62 forwardly. As a result, a traction force is exerted on the second lead wire 60, the free arm 66 and the arm connector 62. Therefore, as shown in FIG. 5 (of which the vertical position corresponds to FIG. 1), the second lead wire 60, the free arm 66 and the arm connector 62 are tensioned, so that the frame element 12 may preferably be forced (downwardly) toward the slide rail assembly 3. As a result, the seat lifting device is reliably locked, thereby preventing the frame element 12 from moving forwardly and upwardly. Therefore, the drive mechanism 70 that is linked to the rear linking mechanism 30 can be effectively prevented from being applied with a considerable large force.

Thus, in this embodiment, the second lead wire 60 is actuated or pulled by means of the piston 50 and the gas generator 52 of the seatbelt pretensioning device 40. In other words, the drive means of the seatbelt pretensioning device 40 is utilized as the actuator of the seat support pulling means. Therefore, it is not necessary to provide any special (additional) actuator for actuating the seat support pulling means. As a result, design freedom of the vehicle seat is not substantially limited.

Second Detailed Representative Embodiment

Figure 6:
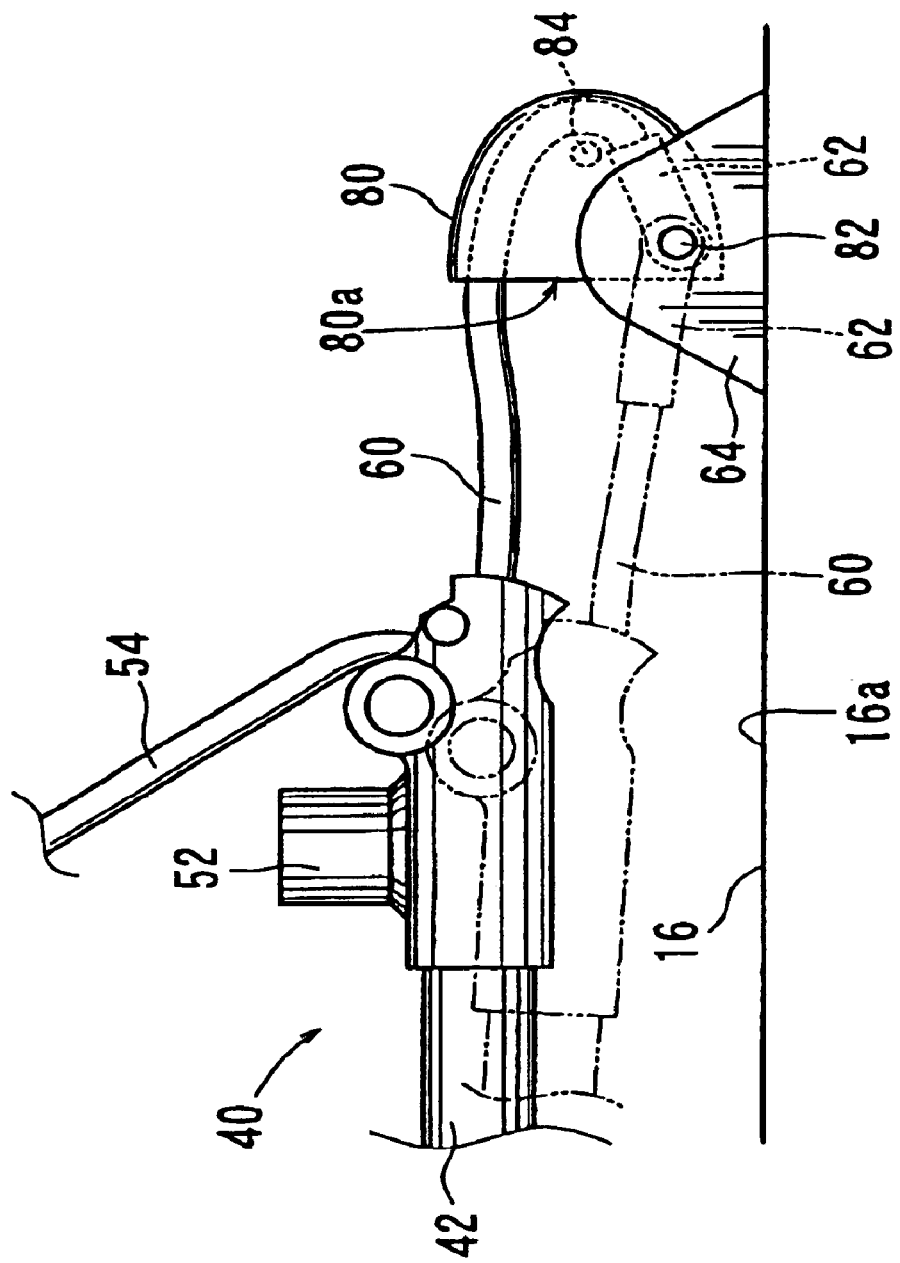
FIG. 6 is a side view similar to FIG. 3, which view illustrates a seatbelt pretensioning device according to a second embodiment of the present teachings.

The second detailed representative embodiment will now described with reference to FIG. 6. Because the second embodiment relates to the first embodiment, only constructions and elements that are different from the first embodiment will be explained in detail. Elements that are the same in the first and second embodiments will be identified by the same reference numerals and detailed description of such elements will be omitted.

In this embodiment, the movable member or free arm used in the first embodiment is omitted. Instead, the seat lifting device may include a semicircular bag-shaped cover 80 having an opening 80a. A lower end of the cover 80 is pivotally connected to the pivot bracket 64 via a pivot pin 82 such that the cover 80 can pivot back and forth around the pivot pin 82. Further, the cover 80 includes a breakable guide pin 84 disposed therein.

Unlike the first embodiment, as shown by a broken line, the second lead wire 60 is introduced into the cover 80 through the opening 80a and is arcuately curved around the guide pin 84. As will be apparent, the arm connector 62 of the second lead wire 60 is directly connected to the-pivot bracket 64 via the pivot pin 82.

According to the seat lifting device of this embodiment, when the vehicle is subjected to the impact and the large or excessive force is applied to the cushion frame 8 via the seatbelt 56, the second lead wire 60 connected to the piston is drawn or pulled into the cylinder 42, thereby breaking the breakable guide pin 84 and pulling the arm connector 62 forwardly. As a result, the traction force is exerted on the second lead wire 60 and the arm connector 62. Therefore, as shown by a chain double dashed line, the second lead wire 60 and the arm connector 62 are tensioned, so that the frame element may preferably be forced (downwardly) toward the slide rail assembly.

Various changes and modifications may be made to the representative embodiments without departing from the scope of the present invention. For example, although the drive means of the seatbelt pretensioning device 40 is utilized as the actuator of the seat support pulling means in the first and second embodiments, a special (additional) actuator for actuating the seat support pulling means can be used, if desired.

Further, the seatbelt pretensioning device is not limited to the representative embodiments. For example, the seatbelt pretensioning device may be a different type of device that includes a compressed coil spring (i.e., another representative drive force generating means), a slide block (i.e., another representative movable means) and a triggering mechanism. In such a seatbelt pretensioning device, when the vehicle is subjected to an impact, the triggering mechanism is actuated and the coil spring will expand. As a result, the slide block is moved (biased) by the elastic spring force of the coil spring, so that the first and second lead wires 54 and 60 are pulled back.

Representative examples of the present teachings have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

What is claimed is:

1. A seat lifting device comprising:
   a linking mechanism arranged and constructed to movably interconnect a seat support for supporting a seat cushion and a seat mount for mounting the seat support, so that the seat cushion is vertically adjusted when the linking mechanism is operated;
   a seat support pulling means arranged and constructed to be connected to the seat support and the seat mount, the seat support pulling means being adapted to be shortened when the seat support is subjected to an impact, and
   an actuator for actuating the seat support pulling means, wherein the actuator is adapted to shorten the seat support pulling means when the seat support is subjected to the impact thereby forcing the seat support toward the seat mount, and wherein the actuator comprises a drive means of a seatbelt pretensioning device.

2. A seat lifting device an defined in claim 1 further comprising a movable member that is movably connected to the seat mount so as to pivot back and forth, wherein the seat support pulling means is connected to the seat mount via the movable member.

3. A seat lifting device as defined in claim 1, wherein the seat support pulling means comprises a flexible member.

4. A seat lifting device as defined in claim 1, wherein the seat support pulling means has a substantial length that corresponds to a maximum lifted position of the seat support.

5. A seat lifting device as defined in claim 1, wherein the drive means of the seatbelt pretensioning device comprises a cylinder and a piston that is connected to a seatbelt, and wherein the piston is connected to the seat support pulling means, thereby simultaneously pulling the seatbelt and the seat support pulling means when the seat support is subjected to the impact.

6. A seat lifting device, comprising:
   a linking mechanism arranged and constructed to movably; interconnect a seat support for supporting a seat cushion and a seat mount for mounting the seat support, so that the seat cushion is vertically adjusted when the linking mechanism is operated;
   a seat support pulling means arranged and constructed to be connected to the seat support and the seat mount; and
   an actuator for actuating the seat support pulling means, the actuator being arranged and constructed to move with the seat support when the linking mechanism is operated, the actuator being adapted to actuate the seat support pulling means when the seat support is subjected to the impact, thereby forcing the seat support toward the seat mount.

7. A vehicle seat, comprising:
   a seat body comprising a seat cushion and a seat back;
   a seat support for supporting the seat cushion;
   a seat mount for mounting the seat support to a vehicle body;
   a linking mechanism that is disposed between the seat support and the seat mount and is adapted to vertically adjust the seat support relative to the seat mount;
   a seatbelt for restraining an occupant of the scat body to the seat body when a vehicle is subjected to an impact;
   a seatbelt pretensioning device attached to the seal support, the seatbelt pretensioning device being adapted to pull a first wire connected to one end of the seatbelt when the vehicle is subjected to the impact; and a connecting member having a first end that is incorporated into the seatbelt pretensioning device and a second end that is connected to the seat mount, the connecting member having a length required to move the seat support relative to the seat mount and being arranged and constructed to be pulled into the seatbelt pretenisioning device together with the first wire.

8. A vehicle seat as defined in claim 7, wherein the connecting member comprises a second wire, and a free arm having a first end that is pivotally connected to the seat mount and a second end that is connected to one end of the second wire.

9. A vehicle seat as defined in claim 8, wherein the seatbelt pretensioning device is attached to a side of the seat support that faces a vehicle entrance, and wherein the connecting member is connected to a side of the seat mount that faces a vehicle entrance and is positioned behind the seatbelt pretensioning device.

10. A vehicle seat, comprising:

a linking mechanism movably interconnecting a seat support and a seat mount;

a seatbelt for restraining an occupant when a vehicle is subjected to an impact, the seatbelt being connected to the seat support at a connecting position;

a seat support pulling means connected to the seat support and the seat mount, wherein the seat support pulling means has a substantial length so as not to interfere with upward and downward motion of the seat support relative to the seat mount when the linking mechanism is operated, wherein the seat support pulling means has a first end that is connected to the seat support and a second end that is connected to the seat mount, and wherein the first end is positioned adjacent to the seatbelt connecting position and the second end is positioned rearwardly relative to the first end; and an actuator for actuating the scat support pulling means so as to shorten the seat support pulling means when the vehicle is subjected to the impact.

\* \* \* \* \*